(12) United States Patent
Weinmeister et al.

(10) Patent No.: US 11,047,804 B2
(45) Date of Patent: Jun. 29, 2021

(54) DETECTION OF CONTAMINATION ON STEEL PARTS USING ULTRAVIOLET LIGHT

(71) Applicant: Voestalpine Automotive Components Cartersville Inc., White, GA (US)

(72) Inventors: Wilhelm Weinmeister, Dallas, TX (US); Hemanth Krishna Chinmaya, Alpharetta, GA (US)

(73) Assignee: voestalpine Automotive Components Cartersville Inc., White, GA (US)

( * ) Notice: Subject to any disclaimer, the term of this patent is extended or adjusted under 35 U.S.C. 154(b) by 0 days.

(21) Appl. No.: 16/677,940

(22) Filed: Nov. 8, 2019

(65) Prior Publication Data

US 2021/0140896 A1    May 13, 2021

(51) Int. Cl.
*G01N 21/94* (2006.01)
*G01N 21/956* (2006.01)
(Continued)

(52) U.S. Cl.
CPC ............ *G01N 21/94* (2013.01); *G01N 21/33* (2013.01); *G01N 21/64* (2013.01); *G01N 21/8806* (2013.01); *G01N 21/8851* (2013.01); *G01N 21/95684* (2013.01); *G06T 7/0004* (2013.01); *G01N 2021/8809* (2013.01);
(Continued)

(58) Field of Classification Search
CPC .. G01N 21/94; G01N 21/95684; G01N 21/33; G01N 21/8851; G01N 21/64; G01N 21/8806; G01N 2201/061; G01N 2021/8809; G01N 2021/8887; G06T 7/0004; G06T 2207/30136
See application file for complete search history.

(56) References Cited

U.S. PATENT DOCUMENTS 9,194,034 B2 * 11/2015 Steins ................... C21D 9/46
2006/0226584 A1   10/2006 Maeda
2010/0098956 A1    4/2010 Sepeur et al.

FOREIGN PATENT DOCUMENTS

CN   204649635 U   9/2015
CN   208695058 U   4/2019
(Continued)

OTHER PUBLICATIONS

Kudlaceketal. (Luminescence Method—Instrument Used for Detection of Surface Cleanliness; Tehnički vjesnik22, 4(2015), 1051-1055 (Year: 2015).*
(Continued)

*Primary Examiner* — David P Porta
*Assistant Examiner* — Meenakshi S Sahu
(74) *Attorney, Agent, or Firm* — Saliwanchik, Lloyd & Eisenschenk

(57) ABSTRACT

There is disclosed methods and apparatus for detecting contamination on cold-formed steel parts prior to subsequent press-hardening in which such contamination may be problematic, and also for detecting contamination on cold-forming machinery that might be transferred to cold-formed steel parts during cold-forming. In some aspects, the disclosure also relates to methods and apparatus for detecting splits or cracks in cold-formed steel parts prior to subsequent press-hardening. The methods and apparatus make use of ultraviolet light to detect contamination or to detect splits or cracks.

27 Claims, 3 Drawing Sheets

(51) Int. Cl.
*G01N 21/33* (2006.01)
*G01N 21/64* (2006.01)
*G01N 21/88* (2006.01)
*G06T 7/00* (2017.01)

(52) U.S. Cl.
CPC ........... *G01N 2021/8887* (2013.01); *G01N 2201/061* (2013.01); *G06T 2207/30136* (2013.01)

(56) References Cited

FOREIGN PATENT DOCUMENTS

| CN | 209020425 U | 6/2019 |
|---|---|---|
| JP | 07-181142 A | 7/1995 |

OTHER PUBLICATIONS

International Search Report and Written Opinion with dated Feb. 8, 2021 in International Application No, PCT/IB2020/060460.
Babichenko, S. et al., "Non-Contact, Real-Time Laser-Induced Fluorescence Detection and Monitoring of Microbial Contaminants on Solid Surfaces Before, During and After Decontamination", Journal of Biosensors & Bioelectronics, 2018, 9(2):1-9.
Everard, C.D. et al., "Assessment of a handheld fluorescence imaging device as an aid for detection of food residues on processing surfaces", Food Control, 2016, 59:243-249, 2015 Elsevier Ltd.
Vilaseca, M. et al., "Investigation into adhesive wear of PVD coated and uncoated hot stamping production tools", Wear, 2013, 308:148-154, Elsevier B.V.

\* cited by examiner

DETECTION OF CONTAMINATION ON STEEL PARTS USING ULTRAVIOLET LIGHT

This disclosure relates to methods and apparatus for detecting contamination on cold-formed steel components prior to subsequent press-hardening in which such contamination may be problematic, and also for detecting contamination on cold-forming machinery that might be transferred to cold-formed steel components during cold-forming. In some aspects, the disclosure also relates to methods and apparatus for detecting splits or cracks in cold-formed steel components prior to subsequent press-hardening. The methods and apparatus make use of ultraviolet light to detect contamination or to detect splits or cracks.

BACKGROUND

It is known that structural components of motor vehicle bodies are made of hardened steel components in order to make them particularly stable.

These hardened steel components are produced in two conventional ways: either i) a flat blank of steel sheet is heated, austenitized and then hot formed and hardened, or ii) a component is cold formed from steel sheet, then heated and quench hardened while being held in a tool which corresponds to the contour or shape of the component.

In both cases, heating for hardening purposes usually takes place in a furnace. The heating promotes conversion of the steel from the ferrite phase into the austenite phase, while subsequent controlled rapid cooling or quenching promotes conversion from the austenite phase into the hard, martensite phase. The furnace atmosphere can influence the surface of the steel being heated due to the very high temperatures (sometimes above 900° C.), regardless of the heating method used.

This is of particular importance when galvanized steel blanks are used. It is desirable that an oxide layer should form on the surface of a zinc layer due to the presence of small amounts of oxygen-affine elements. The oxide layer helps to protect the underlying zinc layer of the galvanized steel component when it is being heated in the furnace. Without a protective oxide coating, there is a risk that the zinc coating may evaporate or be burned away.

It will be appreciated that oxidation reactions may occur on the surface of steel sheet blanks or cold formed steel components even when these are not galvanized, or are coated with a material other than zinc, or are not coated at all.

Both iron from the steel as well as alloy components such as manganese may lead to oxidation reactions on the surface. With coated steels, the coating reacts with the steel and, in addition to the coating components, iron and the alloying elements of the steel can also lead to oxidation reactions on the surface. In galvanized steels, the alloying elements of the zinc coating can also oxidize. In particular, oxygen-affine elements such as aluminum form an AlO layer or $Al_2O_3$ layer, and manganese oxide layers or zinc oxide layers or mixed oxides may also be formed on the surface.

Suitable steels for this quench hardening process include steels alloyed with manganese and boron, which are well known to persons skilled in the art. For example, 22MnB5 or 20MnB8 steel are known to be suitable, although other steels may also be suitable.

The oxide layers formed during heating will also influence subsequent processes such as welding, bonding and painting.

Optionally, the oxide layers may be completely or partially removed after the heat treatment, for example by abrasive blasting.

BRIEF SUMMARY OF THE DISCLOSURE

The present inventors have discovered that certain forms of contamination on the surface of a cold-formed sheet steel component prior to press-hardening, for example due to fingerprints or oil, or due to debris (such as particles of zinc flaking off from galvanized steel sheet blanks) from the cold-forming process, can lead to unwanted blooming and other defects in the finished product during the press-hardening process. It is currently believed that these forms of contamination interfere with or hinder the formation of a protective oxide coating over the contaminated parts of the sheet steel component, which can result in evaporation or burning away of areas of underlying zinc coatings in galvanized steels. As well as giving rise to unsightly "blooming" on the surface of the sheet steel component, areas where the zinc coating has been damaged will be prone to subsequent corrosion.

Viewed from a first aspect, there is provided a method of detecting contamination on steel parts prior to austenitizing heat treatment and press-hardening, in which the steel parts are exposed to ultraviolet light to highlight contamination on the surface of the parts.

Viewed from a second aspect, there is provided an apparatus for detecting contamination on steel parts prior to austenitizing heat treatment and press-hardening, the apparatus comprising an inspection volume and an ultraviolet light source configured to irradiate the inspection volume with ultraviolet light.

Viewed from a third aspect, there is provided a method of detecting contamination on steel cold-forming machinery, in which at least parts of the machinery are exposed to ultraviolet light to highlight contamination on the surface of the parts.

In some embodiments, the steel parts are cold-formed steel parts. That is, the steel parts have been subjected to a cold-forming process prior to heating, for example in a furnace, so as to convert the steel to the austenitic phase, before subsequent quenching to convert the steel to the martensitic phase.

In other embodiments, the steel parts are steel sheet blanks, which are subsequently heated so as to convert the steel to the austenitic phase, then hot-formed, and then quenched to convert the steel to the martensitic phase The steel parts may be galvanized steel parts having a zinc coating.

BRIEF DESCRIPTION OF THE DRAWINGS

Embodiments of the disclosure are further described hereinafter with reference to the accompanying drawings, in which.

DETAILED DESCRIPTION

Figure 1:
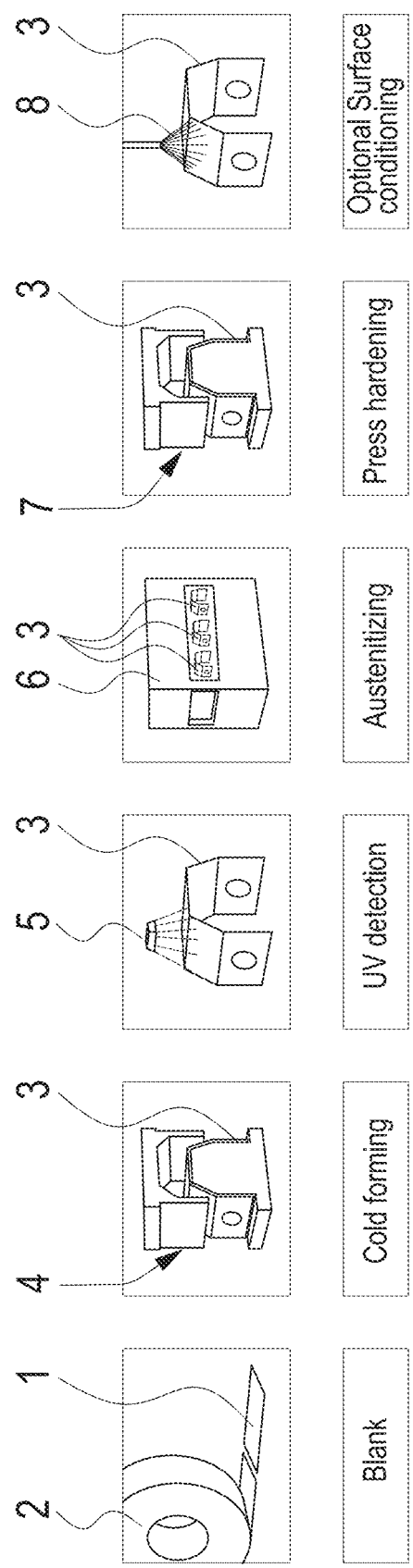
FIG. 1 shows a sequence of process steps according to an embodiment of the disclosure.

Aspects of the present disclosure are based on the surprising realization that many forms of contamination on steel parts that lead to blooming and other contamination defects when the steel parts are subsequently austenitized and press-hardened are not easily visible to the naked eye under white light, but are more easily discernible under ultra violet light.

Examples of such contamination include fingerprints, dirt or dust, zinc flakes generated when cold-forming galvanized steel sheet blanks, salt from human sweat, and dirty or contaminated or incompatible oil from the cold-forming machinery.

Ultra violet light can be used to inspect steel parts prior to austenitization and press-hardening. The ultra violet light causes contaminants, for example fingerprints, dirt or dust, zinc flakes, salt from human sweat, and dirty or contaminated or incompatible oil to fluoresce or glow, making it easier for an operative to identify and remove possible contamination prior to austenitization and press-hardening.

Ultra violet light can also be used to inspect components of cold-forming machinery, such as cold-forming dies and die cavities, to check for contamination that might be transferred to the surfaces of steel parts during cold-forming.

Alternatively or in addition, ultra violet light can be used to highlight splits or cracks or other defects in cold-formed steel parts that might otherwise not be easily visible to the naked eye, and which might give rise to manufacturing defects during a subsequent press-hardening process.

As noted above, contaminants on the surface of steel parts can interfere with or hinder the formation of a protective oxide layer on the surface of the steel parts. A protective oxide layer is of particular importance when austenitizing galvanized steel parts, so as to reduce the risk of the zinc coating evaporating or burning away when the steel parts are heated to high temperatures. Localized defects in the protective oxide layer may give rise to unwanted blooming and other damage to the underlying steel part during austenitization and subsequent press-hardening.

Embodiments of the present disclosure are particularly advantageous in processes where steel sheet blanks are first cold-formed prior to austenitization and subsequent press-hardening. This is because cold-formed steel parts are often handled by human operators rather than robots prior to austenitization, and this carries the risk of contamination by fingerprints and sweat, for example.

Advantageously, the ultra violet light is generated by a blacklight source that emits predominantly ultra violet light and little or no light at visible wavelengths. For many applications, ultraviolet light having a wavelength in a range from about 315 to 400 nm (UV-A) is most suitable, although for some applications ultra violet light having a wavelength from about 280 to 315 nm (UV-B) may be useful.

Certain embodiments of the present disclosure are particularly effective at highlighting salt (sodium chloride) on steel parts from sweat or fingerprints, for example due to operatives not wearing the correct types of gloves when handling steel parts prior to and subsequent to cold-forming. Salt deposits on steel parts can lead to unsightly blooming on the surface of the steel after austenitization and press-hardening. In some cases, the blooming can be so severe as to cause structural defects in the surface. The salt fluoresces noticeably under ultraviolet light, allowing a quality control operative to identify the location of the salt contamination and to take corrective cleaning action. The efficacy of the cleaning action can also be verified under ultra violet light.

Certain embodiments of the present disclosure are particularly effective at highlighting dust or dirt on steel parts prior to austenitization and press-hardening. Dust or dirt contamination on steel parts can lead to unsightly blooming on the surface of the steel after austenitization and press-hardening. In some cases, the blooming can be so severe as to cause structural defects in the surface. The dust or dirt fluoresces noticeably under ultraviolet light, allowing a quality control operative to identify the location of the dust or dirt contamination and to take corrective cleaning action. The efficacy of the cleaning action can also be verified under ultra violet light.

Certain embodiments of the present disclosure are particularly effective at highlighting zinc flakes on steel parts prior to austenitization and press-hardening. Zinc flakes, which can be generated when galvanized steel is cold-formed, can lead to unsightly blooming on the surface of the steel after austenitization and press-hardening. In some cases, the blooming can be so severe as to cause structural defects in the surface. The zinc flakes fluoresce noticeably under ultraviolet light, allowing a quality control operative to identify the location of the zinc flakes and to take corrective cleaning action. The efficacy of the cleaning action can also be verified under ultra violet light.

Certain embodiments of the present disclosure are particularly effective at highlighting oil contamination on steel parts prior to austenitization and press-hardening. Oil contamination, for example from dirty or incompatible oils from the cold-forming machinery, can lead to unsightly blooming on the surface of the steel after austenitization and press-hardening. In some cases, the blooming can be so severe as to cause structural defects in the surface. The oil contamination fluoresces noticeably under ultraviolet light, allowing a quality control operative to identify the location of the oil contamination and to take corrective cleaning action. The efficacy of the cleaning action can also be verified under ultra violet light.

A surprising advantage of certain embodiments is that inspection under ultra violet light may allow different types of contamination to be more easily distinguished from each other than under white light. This can be of significant benefit, since different types of contamination need to be removed in different ways. For example, sodium chloride from human sweat is not soluble in organic solvents such as alcohol, and therefore needs to be cleaned from the surface of the steel part using water or another aqueous solvent. In contrast, oil or grease contamination is best removed using alcohol or other organic solvents. Accordingly, embodiments of the present disclosure allow the type of contaminant to be determined and an appropriate cleaning regimen to be selected.

Certain embodiments of the present disclosure are particularly effective at highlighting splits or cracks in cold-formed steel components. These may arise because of defects in the steel sheet blanks. It has surprisingly been found that illumination under ultra violet light significantly improves contrast and enhances visibility of such splits or cracks in comparison to illumination under white light.

In certain embodiments, there may be provided an inspection station in the form of an ultra violet light booth. The ultra violet light booth may comprise a work surface provided with a canopy defining an inspection volume within which steel sheet blanks and/or cold-formed steel components may be placed. The canopy may incorporate one or more ultra violet light sources configured to emit ultra violet light into the inspection volume. For example, one or more ultra violet light sources may be mounted on or incorporated in one or more interior surfaces of the canopy. The canopy may be configured to shield several sides of the inspection volume from stray ambient light, thereby to allow contaminant fluorescence more easily to be observed, while still providing access to the inspection volume by an operative working in front of the inspection station. The ultra violet light booth may be provided at an end of a cold-forming line to allow easy inspection of steel components prior to austenitization and press-hardening.

In certain embodiments, ultra violet light is used for inspecting parts of the cold-forming line, for example the cold-forming die surfaces. The cold-forming die surfaces may become contaminated with fingerprints, sweat, contaminated or incompatible oil, zinc flakes, dirt or dust, and this contamination may transfer to the cold-formed steel components. Inspection of these parts of the cold-forming line under ultra violet light allows the contamination to be detected more easily, and to verify that cleaning processes have indeed removed the contamination.

Embodiments of the present disclosure are easily incorporated into steel processing lines and provide a safe, simple and cost-effective way of detecting contamination.

Inspection of the steel components under ultra violet light may be undertaken manually, for example at an inspection station as described above.

Alternatively or in addition, inspection of the steel components under ultra violet light may be automated using image processing techniques. For example, one or several cameras may be used to gather images of a steel component under ultra violet illumination, and the images may be subjected to known image processing techniques by a computer to identify the location of any areas of contamination. In some embodiments, the type of contamination may also be identified. The computer may indicate the location, and optionally the type, of contamination to a human operator so as to allow cleaning of the steel component to take place. In some embodiments, the computer may control a robotic cleaning mechanism so as to take appropriate automatic cleaning action. In some embodiments, steel components may be placed on a conveyor belt and passed through an inspection station comprising a canopy defining an inspection volume, one or more sources of ultra violet light, and one or more cameras. The canopy helps to shield the inspection volume from ambient light so as to allow ultra violet fluorescence to be observed more easily by the one or more cameras. The one or more cameras are connected to a computer running appropriate image processing software. The computer may also control the one or more cameras and the one or more sources of ultra violet illumination so as to obtain image date of all surfaces of the steel component. In some embodiments, the one or more sources of ultra violet light may include sources configured to generate different wavelengths of ultra violet light, since this may allow different types of contamination to be better distinguished from each other and identified. Contaminated steel components may automatically be removed from the conveyor belt after the inspection station for cleaning and subsequent re-inspection.

In some embodiments, it is not necessary to inspect every single galvanized steel component, whether manually or automatically. It may be sufficient to inspect only a representative sample of galvanized steel components from a production line in order to obtain an improvement in the avoidance of blooming and other defects.

The Table below shows the results of experimental testing conducted by the present Applicant. Ten sample cold-formed galvanized steel components S1 to S10 were prepared. Some of the samples were deliberately contaminated with finger prints and/or sodium chloride smudges. The contamination was not discernible under ambient white light illumination. Three different human operators OP1, OP2 and OP3 inspected the samples under ultra violet light in accordance with the present disclosure. The results show that all of the operators correctly identified the location and type of contamination when present. On only two occasions did an operator incorrectly identify the presence of a particular type of contamination when it was not present. However, it will be appreciated that a false positive identification is less problematic than a false negative identification.

| Sample Number | Presence of Finger prints true values | OP 1 | OP 2 | OP 3 | Presence of NaCl (salt) smudges | OP 1 | OP 2 | OP 3 |
|---|---|---|---|---|---|---|---|---|
| S1 | 0 | 0 | 0 | 1 | 1 | 1 | 1 | 1 |
| S2 | 1 | 1 | 1 | 1 | 1 | 1 | 1 | 1 |
| S3 | 1 | 1 | 1 | 1 | 0 | 0 | 0 | 0 |
| S4 | 0 | 0 | 0 | 0 | 1 | 1 | 1 | 1 |
| S5 | 1 | 1 | 1 | 1 | 0 | 0 | 0 | 0 |
| S6 | 0 | 0 | 0 | 0 | 1 | 1 | 1 | 1 |
| S7 | 0 | 0 | 0 | 0 | 0 | 1 | 0 | 0 |
| S8 | 1 | 1 | 1 | 1 | 1 | 1 | 1 | 1 |
| S9 | 1 | 1 | 1 | 1 | 1 | 1 | 1 | 1 |
| S10 | 1 | 1 | 1 | 1 | 0 | 0 | 0 | 0 |
| Correlation | | 100.00% | 100.00% | 80.18% | | 80.18% | 100.00% | 100.00% |
| Total Repeatability | | | 93.39% | | | | 93.39% | |

The two error in reading are spots where the inspectors marked yes for contamination when there is no spot present. But there is no error data that shows the risk of inspector not detecting the contamination spot in its presence.

1 - Yes,

0 - No,

Comparing true values with Inspectors reading.

OP 1 - Inspector 1;

OP 2 - Inspector 2;

OP 3 - Inspector 3

With reference to FIG. 1, there is shown, from left to right, a sequence of process steps of an embodiment of the disclosure. First, a galvanized steel sheet blank 1 is cut from a roll 2 of galvanized steel. Second, the galvanized sheet steel blank 1 is cold-formed into a desired galvanised steel component 3 by way of a cold-forming die 4. Third, the cold-formed galvanized steel component 3 is inspected for contamination under ultra violet light illumination from an ultra violet or blacklight source 5. If contamination is determined to be present, the cold-formed galvanized steel component 3 is cleaned to remove the contamination, and re-inspected using the ultra violet of blacklight source 5. Fourth, the cold-formed galvanized steel component 3 (free of contamination) is heated in a furnace 6 to a temperature sufficient to cause conversion of the steel to the austenitic phase. This temperature may be in excess of 900° C. Preferably, the temperature is above the $Ac_3$ temperature for the particular steel composition so as to ensure complete or near complete austenitization. Fifth, the austenitized steel component 3 is placed in an appropriately-configured die or former 7 and then rapidly quenched so as to promote conversion of the steel into the martensitic phase. This step is also known as press-hardening. Placing the steel component 3 in the die or former 7 helps to reduce quench distortions upon rapid cooling. Finally, an optional sixth step of surface conditioning, for example by way of wheel blasting with an appropriate abrasive 8, may be undertaken. The surface conditioning step can be used to remove unwanted oxide layers from the surface of the steel component 3, or to smooth away rough edges.

Figure 2A:
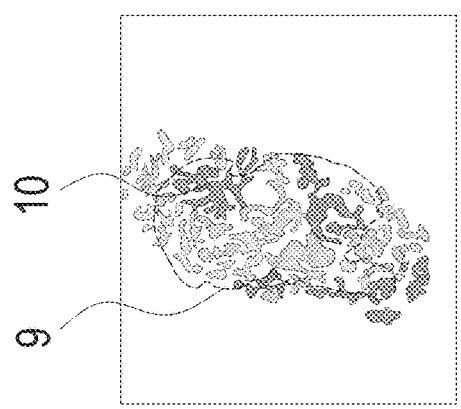
FIG. 2a shows an outline of a contaminated portion on a cold-formed steel part.
Figure 2B:
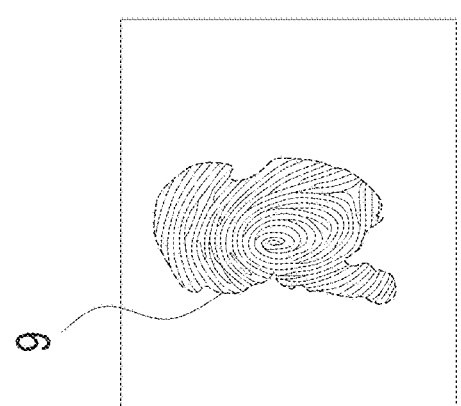
FIG. 2b shows the contaminated portion of FIG. 2a in more detail, revealing it to be a fingerprint.
Figure 2C:
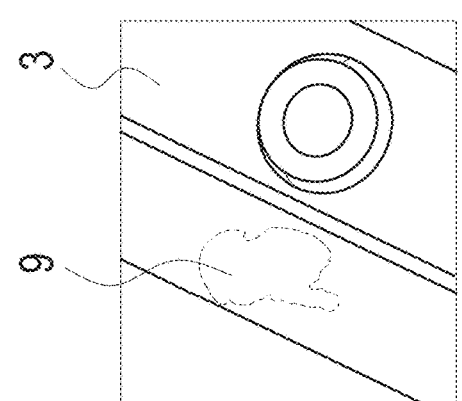
FIG. 2c shows the contaminated portion of FIGS. 2a and 2b under ultra violet light.

FIG. 2a shows a contamination mark 9 on a galvanized steel component 3 after cold-forming but before austenitization and press-hardening. FIG. 2b shows the contamination mark 9 in more detail. In this case, the contamination mark 9 is due to a fingerprint of a human operator. The fingerprint contains sodium chloride from sweat, which can interfere with the formation of a protective oxide layer on the steel component 3. The contamination mark 9 is very difficult to see under normal or ambient white light conditions. FIG. 2c shows the same contamination mark 9 illuminated under ultra violet or blacklight illumination. The ultra violet or blacklight illumination causes noticeable fluorescence of the sodium chloride in the contamination mark 9, as indicated by the fluorescent regions 10. This allows the contamination mark 9 to be quickly identified and cleaned from the surface of the steel component 3 prior to austenitization and press-hardening.

Figure 3A:
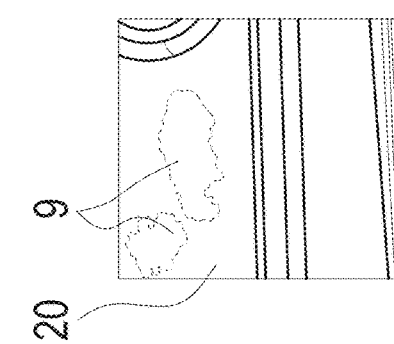
FIG. 3a shows a close-up view of contamination on a die of a cold-forming machine.

FIG. 3a shows a close-up view of a contamination mark 9 shown in outline on a die 20 of a cold-forming machine under normal or ambient white light conditions. The contamination mark 9 is almost or completely invisible under such conditions.

Figure 3B:
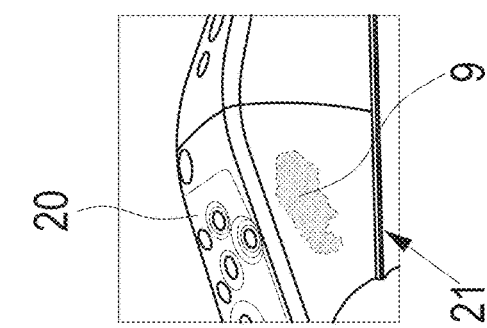
FIG. 3b shows a view of contamination on a die of a cold-forming machine under ultra violet light.

FIG. 3b shows a view of a contamination mark 9 on a die 20 of a cold-forming machine 21 under ultra violet light. It can be seen that the contamination mark 9 is much more visible under ultra violet light.

Figure 3C:
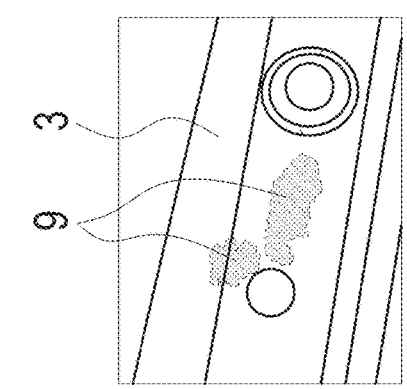
FIG. 3c is a view of a cold-formed steel part formed by the cold-forming machine of FIG. 3a, under ultra violet light, showing how the contamination is transferred from the die of the cold-forming machine to the cold-formed steel part.

FIG. 3c is a view of a cold-formed steel part 3 formed by the die 20 of the cold-forming machine of FIG. 3a, prior to austenitization and under ultra violet light, showing how contamination is transferred from the die 20 of the cold-forming machine to the cold-formed steel part 3 during the cold-forming process. The contamination may take the form of sodium chloride from human sweat, fingerprints, oil or grease, zinc flakes, or other forms of contamination. The contamination mark 9 on the cold-formed steel part 3 is clearly visible under ultra violet light.

Figure 3D:
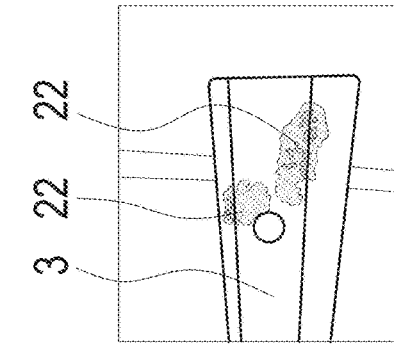
FIG. 3d shows a cold-formed steel part after austenitization and quenching, where contamination on the part has resulted in surface defects or blooming on the part.

FIG. 3d shows a cold-formed steel part 3 after austenitization and quenching, where contamination on the part 3 has resulted in surface defects or blooming 22 on the part 3. The surface defects or blooming 22, as well as being unsightly, can represent weak points in or absences of a protective zinc coating on galvanized steel components, and can thus leave the steel components vulnerable to corrosion.

Figure 4:
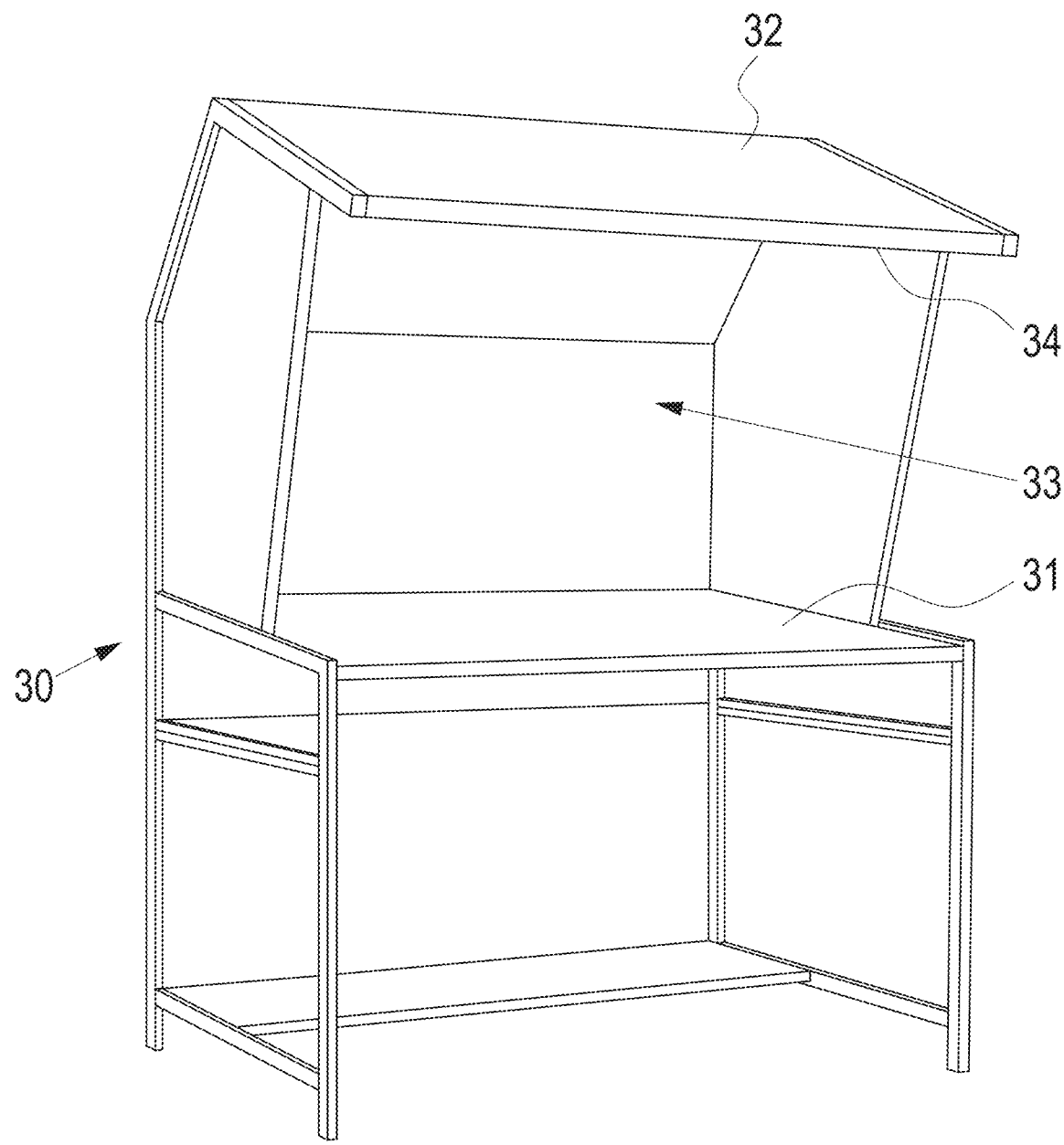
FIG. 4 shows an ultra violet inspection booth of an embodiment of the disclosure.

FIG. 4 shows an embodiment of the disclosure comprising an apparatus for detecting contamination on steel components prior to austenitizing heat treatment and press-hardening, the apparatus comprising an inspection volume and an ultraviolet light source configured to irradiate the inspection volume with ultraviolet light.

The apparatus shown in FIG. 4 comprises an inspection station in the form of an ultra violet light booth 30. The ultra violet light booth 30 may comprise a work surface 31 provided with a canopy 32 defining an inspection volume 33 within which steel sheet blanks or steel components 3 may be placed. The canopy 32 incorporates one or more ultra violet light sources 34 configured to emit ultra violet light into the inspection volume 33. The one or more ultra violet light sources 34 are mounted on or incorporated in one or more interior surfaces of the canopy 32. The canopy 32 is configured to shield several sides of the inspection volume 33 from stray ambient light. This allows contaminant fluorescence more easily to be observed, while still providing access to the inspection volume 33 by an operative working in front of the inspection station. The ultra violet light booth 30 may be provided at an end of a cold-forming line to allow easy inspection of steel components 3 prior to austenitization and press-hardening.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of inhibiting steel blooming due to contamination by detecting contamination on a steel part prior to austenitization and press-hardening, the method comprising:
    exposing the steel part to ultraviolet light to highlight contamination, or to highlight splits or cracks, on the surface of the part; and
    removing detected contamination from the steel part by subjecting the steel part with the detected contamination to a cleaning step.

2. The method of claim 1, wherein the steel part is a galvanized steel part.

3. The method of claim 1, wherein the steel part is a cold-formed steel component.

4. The method of claim 1, wherein the ultraviolet light causes the contamination to fluoresce.

5. The method of claim 1, wherein the contamination comprises at least one of fingerprints, dirt, dust, zinc flakes, salt from human sweat, and oil.

6. The method of claim 5, wherein different kinds of contamination are distinguished from each other on the basis of their fluorescence under the ultraviolet light.

7. The method of claim 6, wherein different cleaning regimens are selected for cleaning the contamination from the surface of the steel part on the basis of the determined kind of contamination.

8. The method of claim 1, wherein the detected contamination is removed from the steel part prior to austenitization and press-forming so as to ameliorate blooming during austenitization and press-hardening.

9. The method of claim 1, wherein the ultraviolet light is generated by a blacklight source.

10. The method of claim 1, wherein the ultraviolet light has a wavelength between about 315 and 400 nm.

11. The method of claim 1, wherein the ultraviolet light has a wavelength between about 280 and 315 nm.

12. The method of claim 1, wherein the ultraviolet light has a wavelength between about 280 and 400 nm.

13. The method of claim 1, further comprising collecting at least one image of the steel part under ultraviolet light by way of at least one camera, and identifying contamination, or splits or cracks, on the surface of the steel part by way of a computer running image processing software.

14. An apparatus for inhibiting steel blooming due to contamination by detecting contamination on steel parts prior to austenitization and press-hardening, the apparatus comprising an inspection volume and an ultraviolet light source configured to irradiate the inspection volume with ultraviolet light.

15. The apparatus of claim 14, wherein the inspection volume is defined by a work surface and a canopy.

16. The apparatus of claim 14, wherein the ultraviolet light source is provided on an interior surface of the canopy.

17. A method of inhibiting steel blooming due to contamination by detecting contamination on steel cold-forming machinery, the method comprising:
    exposing at least parts of the machinery to ultraviolet light to highlight contamination on the surface of the parts; and
    removing detected contamination by subjecting the surface of the parts with the detected contamination to a cleaning step.

18. The method of claim 17, wherein the ultraviolet light causes the contamination to fluoresce.

19. The method of claim 17, wherein the contamination comprises at least one of fingerprints, dirt, dust, zinc flakes, salt from human sweat, and oil.

20. The method of claim 19, wherein different kinds of contamination are distinguished from each other on the basis of their fluorescence under the ultraviolet light.

21. The method of claim 20, wherein different cleaning regimens are selected for cleaning the contamination from the surface of parts on the basis of the determined kind of contamination.

22. The method of claim 17, wherein the detected contamination is removed from the parts of the machinery so as to avoid transfer of contamination to cold-formed steel parts and to ameliorate blooming during subsequent press-hardening of the cold-formed steel parts.

23. The method of claim 17, wherein the ultraviolet light is generated by a blacklight source.

24. The method of claim 17, wherein the ultraviolet light has a wavelength between about 315 and 400 nm.

25. The method of claim 17, wherein the ultraviolet light has a wavelength between about 280 and 315 nm.

26. The method of claim 17, wherein the ultraviolet light has a wavelength between about 280 and 400 nm.

27. A method of claim 1, further comprising verifying an efficiency of the cleaning step under ultraviolet light.

* * * * *